(12) United States Patent  
Cadden

(10) Patent No.: US 6,390,485 B1
(45) Date of Patent: May 21, 2002

(54) VEHICLE SUSPENSION

(75) Inventor: Robert L. Cadden, Parkdale (AU)

(73) Assignee: The Boler Company., Itasca, IL (US)

( * ) Notice: Subject to any disclaimer, the term of this patent is extended or adjusted under 35 U.S.C. 154(b) by 684 days.

(21) Appl. No.: 08/693,985

(22) Filed: Aug. 8, 1996

(30) Foreign Application Priority Data

Aug. 30, 1995 (AU) .......................................... PN 5091

(51) Int. Cl.⁷ ............................................. B60G 11/46
(52) U.S. Cl. ........................... 280/124.163; 280/124.1; 280/124.162
(58) Field of Search .................... 280/710, 688, 280/712, 715, 718, 720, 692, 697, 699, 124.1, 124.109, 124.11, 124.116, 124.162, 124.163

(56) References Cited

U.S. PATENT DOCUMENTS

| | | | | |
|---|---|---|---|---|
| 2,576,935 A | * | 12/1951 | Hayes | ........................... 267/15 |
| 3,406,983 A | | 10/1968 | Masser | |
| 3,531,099 A | * | 9/1970 | King | ........................... 267/56 |
| 4,114,923 A | | 9/1978 | Raidel | |
| 4,309,045 A | | 1/1982 | Raidel | |
| 4,379,572 A | | 4/1983 | Hedenberg | |
| 4,518,171 A | | 5/1985 | Hedenberg | |
| 4,705,294 A | * | 11/1987 | Raidel | |
| 4,756,550 A | | 7/1988 | Raidel | |
| 5,288,100 A | | 2/1994 | Cherry et al. | |
| 5,346,247 A | * | 9/1994 | Snyder | ........................ 280/712 |
| 5,378,010 A | | 1/1995 | Marino et al. | |
| 5,458,359 A | * | 10/1995 | Brandt | ........................ 280/673 |
| 5,470,096 A | * | 11/1995 | Baxter | ........................ 280/712 |

FOREIGN PATENT DOCUMENTS

CA 971583 * 7/1975

* cited by examiner

*Primary Examiner*—Eric Culbreth
(74) *Attorney, Agent, or Firm*—Cook, Alex, McFarron, Manzo, Cummings & Mehler, Ltd.

(57) ABSTRACT

The invention provides a suspension system (10) for installation between a chassis having side rail members (14,16) and cross frame members (22,24,26) and an axle (18,20) of a vehicle. A step spring (36) is included having a forward generally horizontal section (38), a rearward generally horizontal section (42), and a generally vertical section (40) between and contiguous with the forward and rearward sections (38,42) and displacing the rearward section (42) below the forward section (38). The leading end of step spring (36) is pivotally attached to the chassis with a spring (68) extending between the chassis and the trailing end of step spring (36). Axle (18,20) is pivotally secured to a mounting (58,60) on forward generally horizontal section (38) with the pivot (56) above axle (18,20).

8 Claims, 7 Drawing Sheets

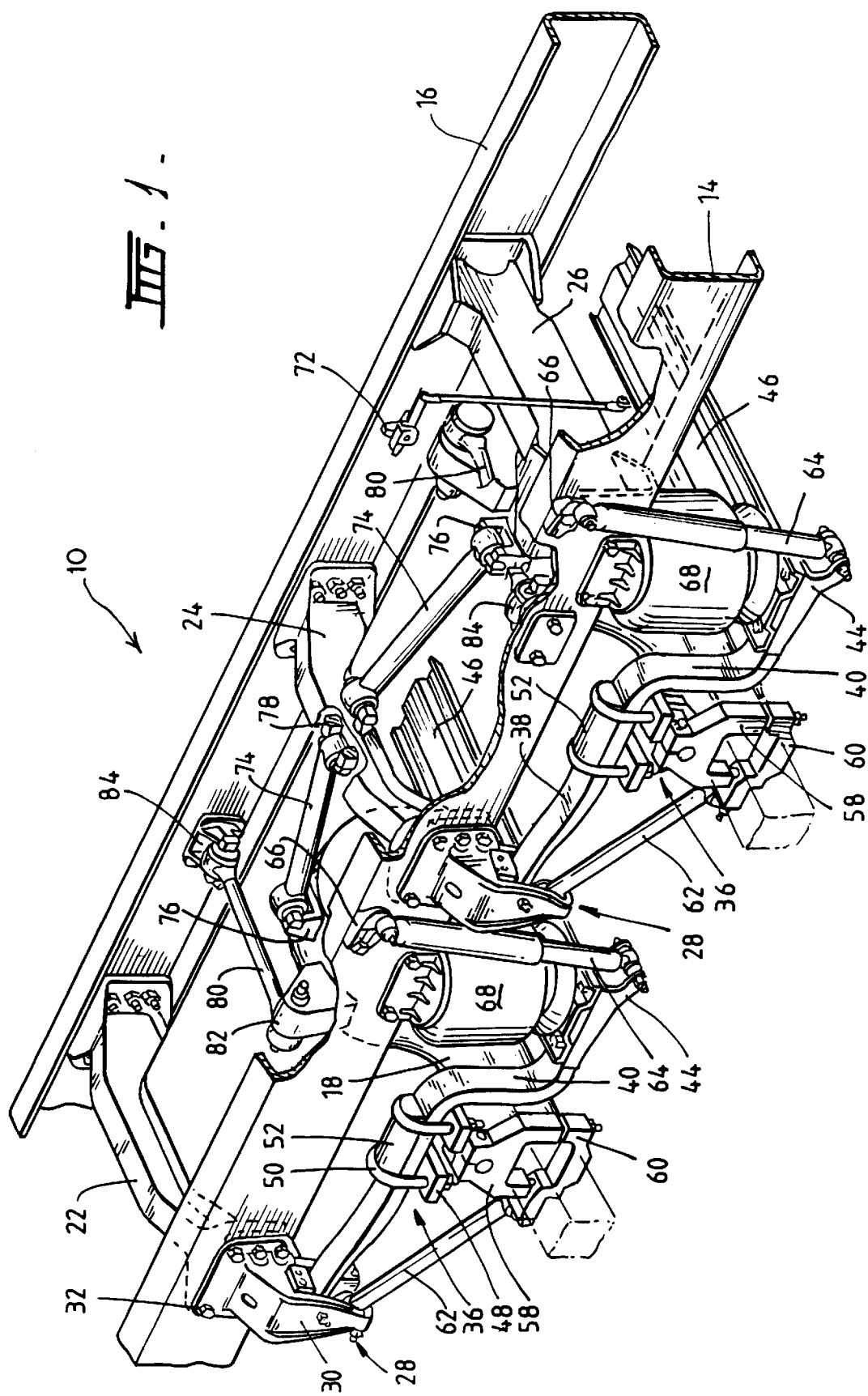

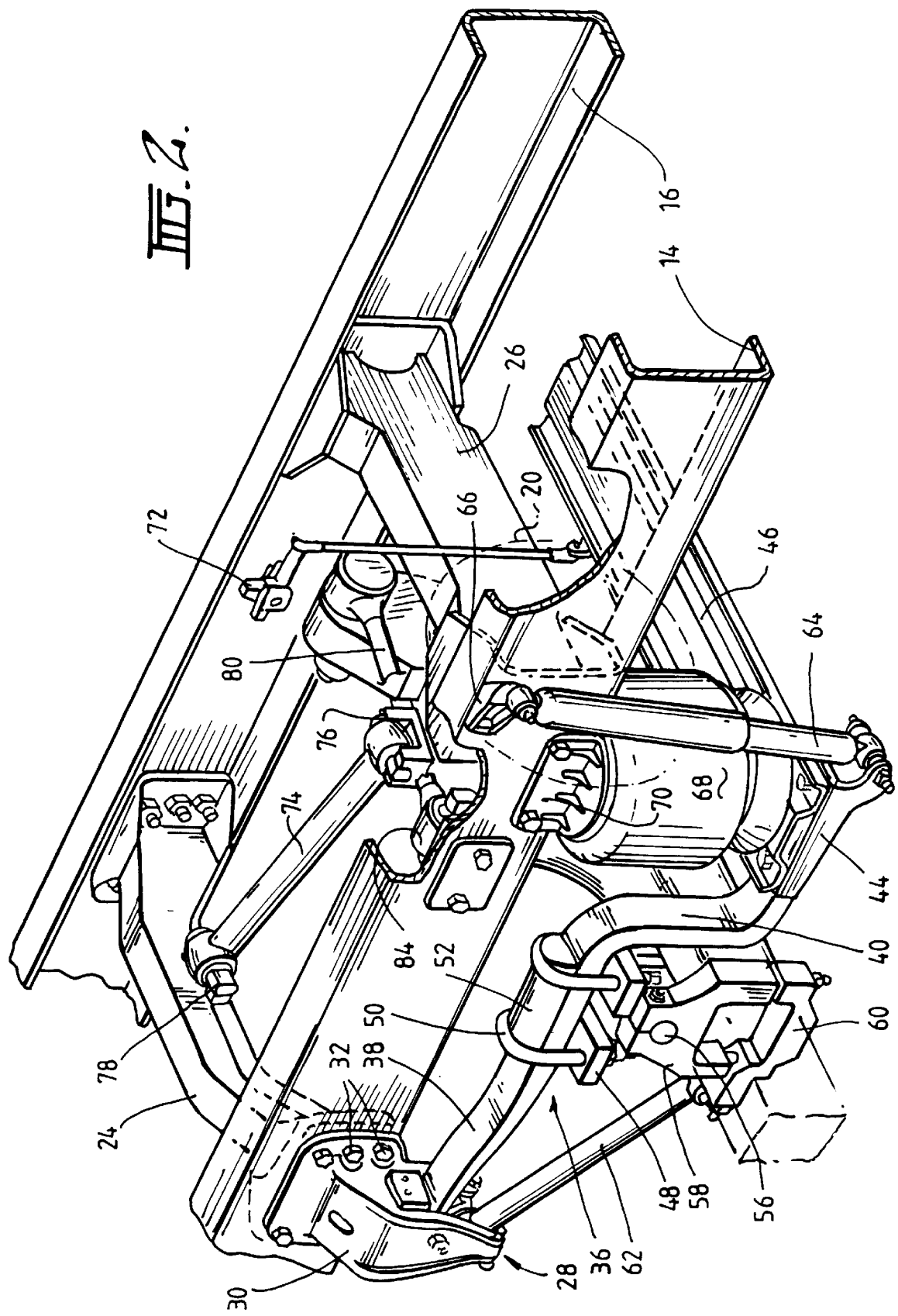

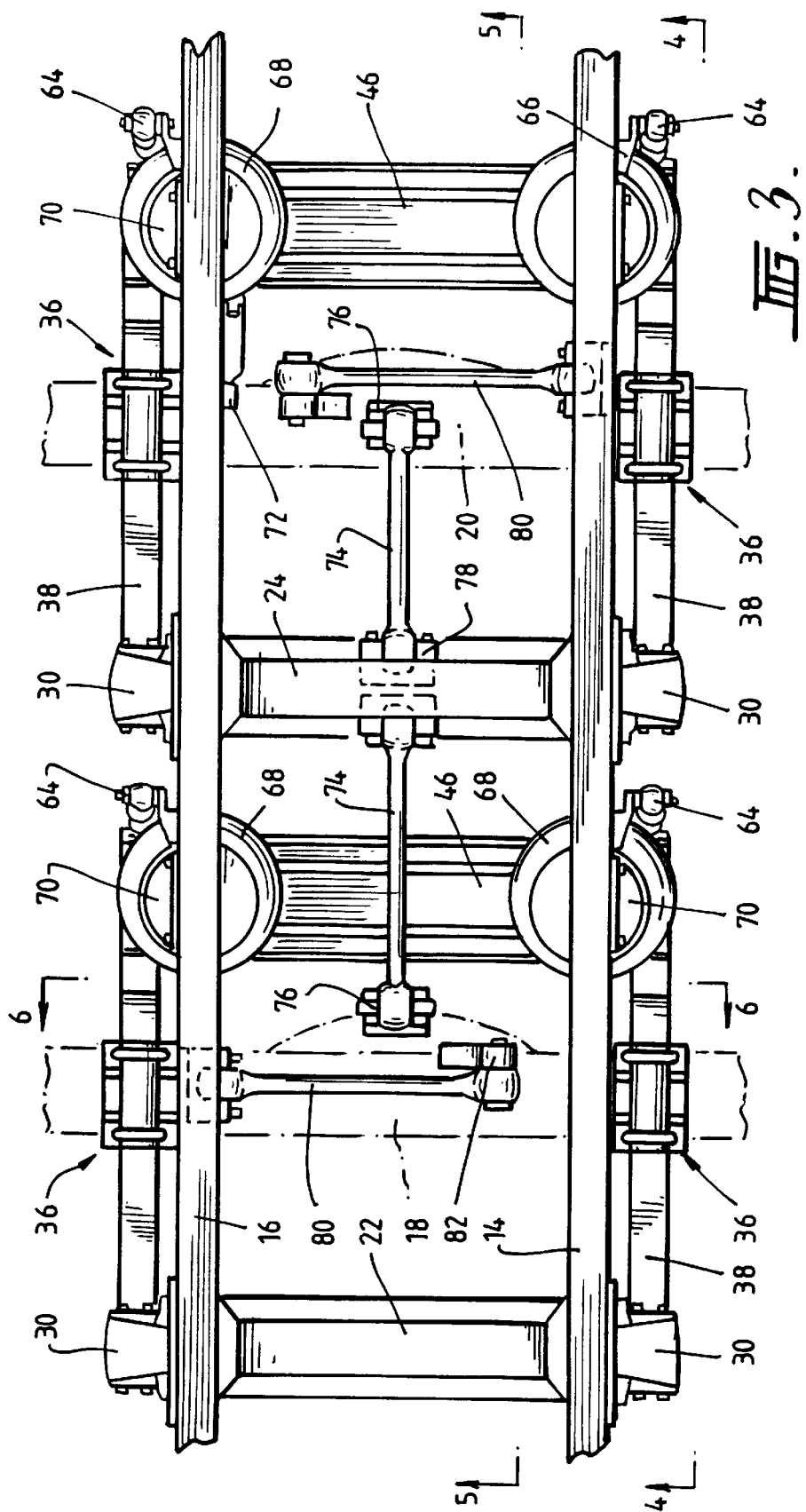

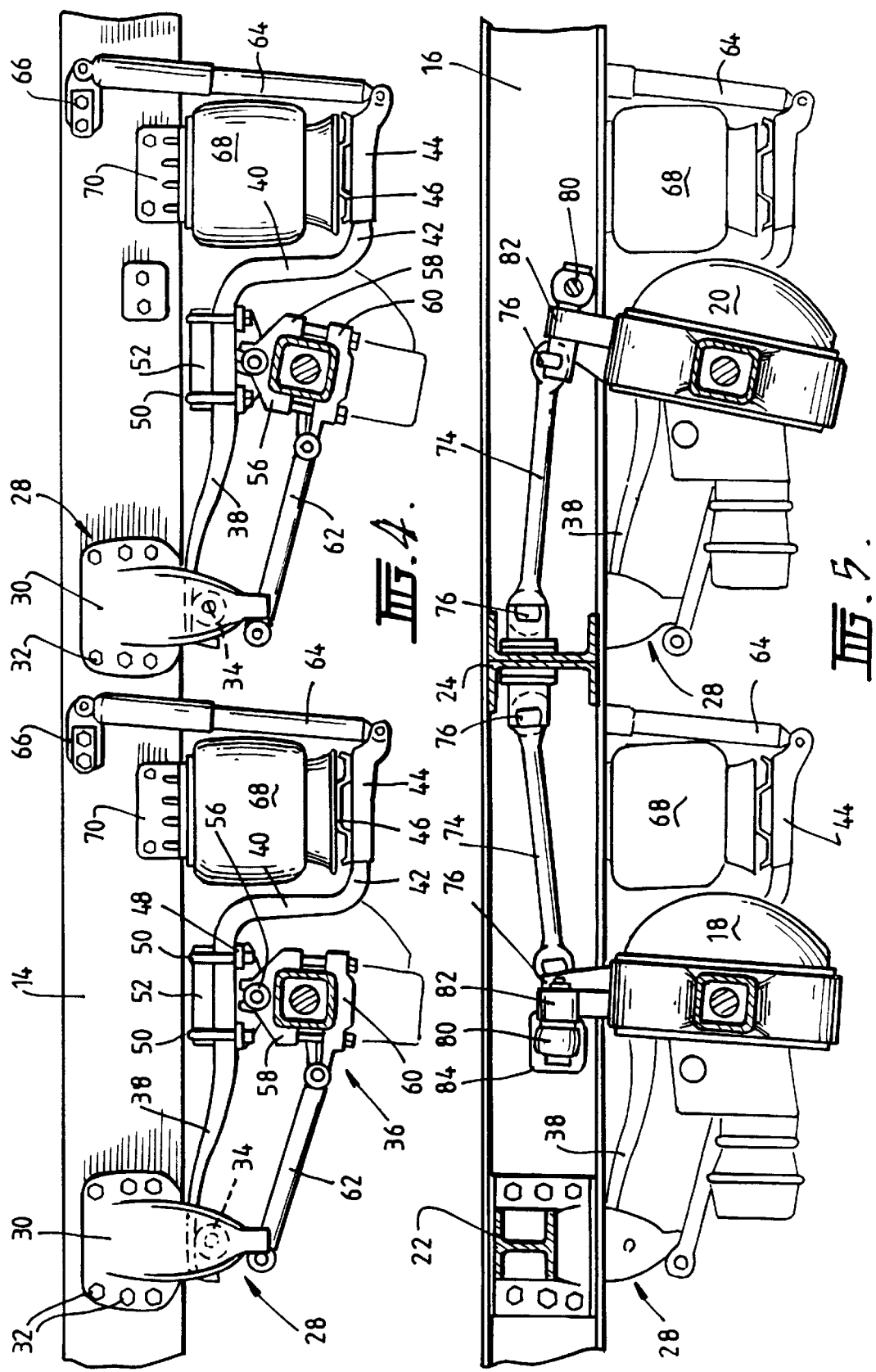

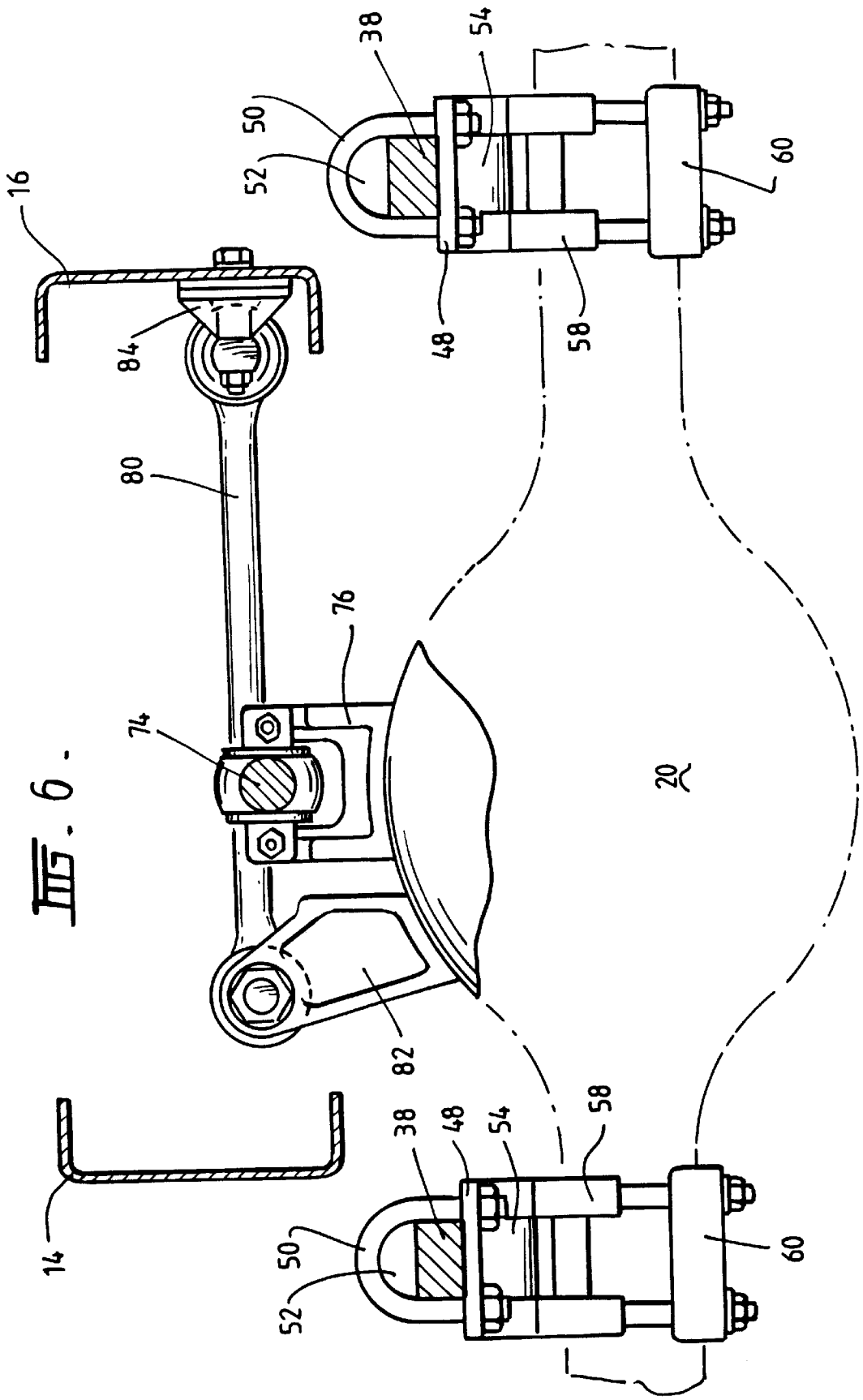

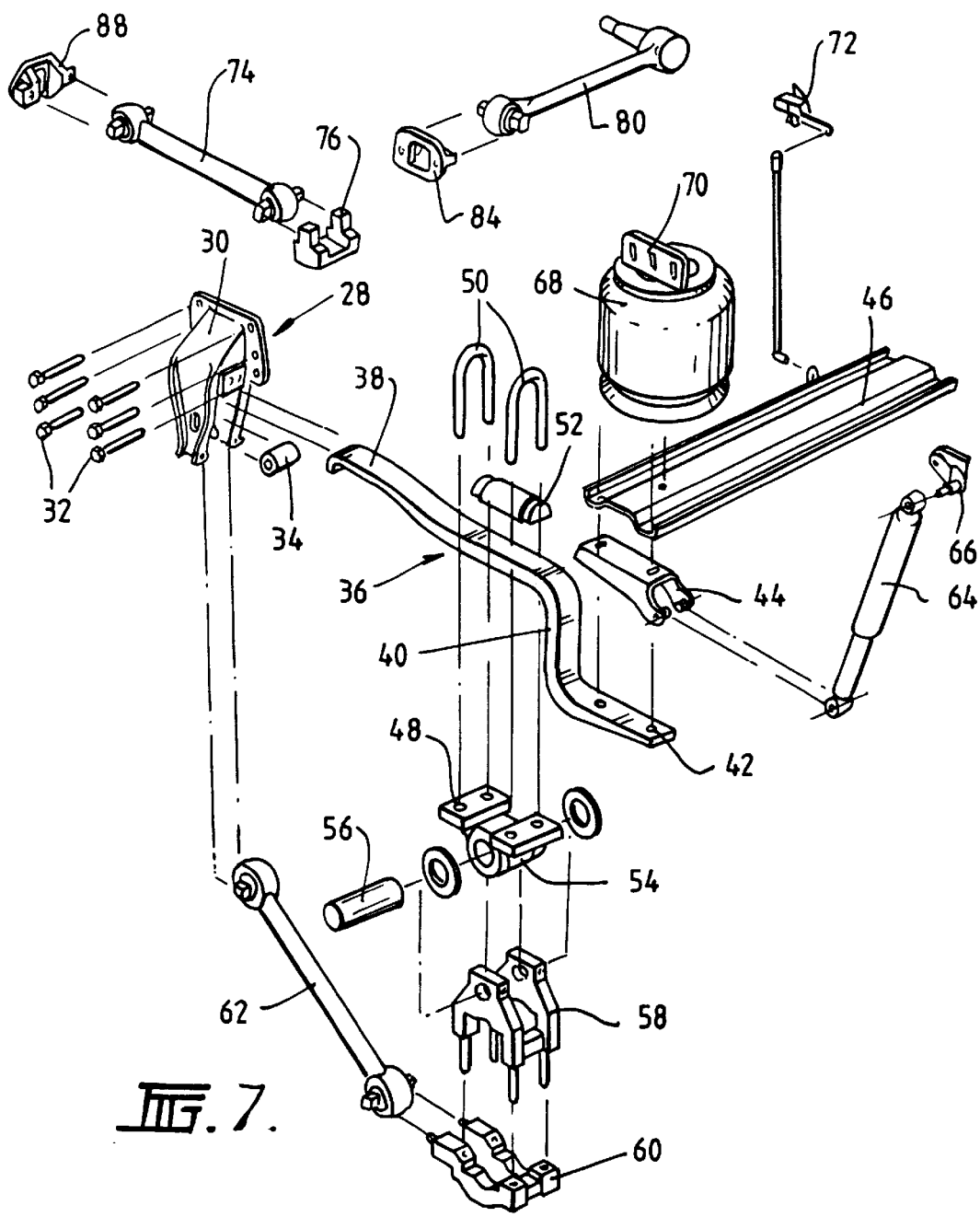

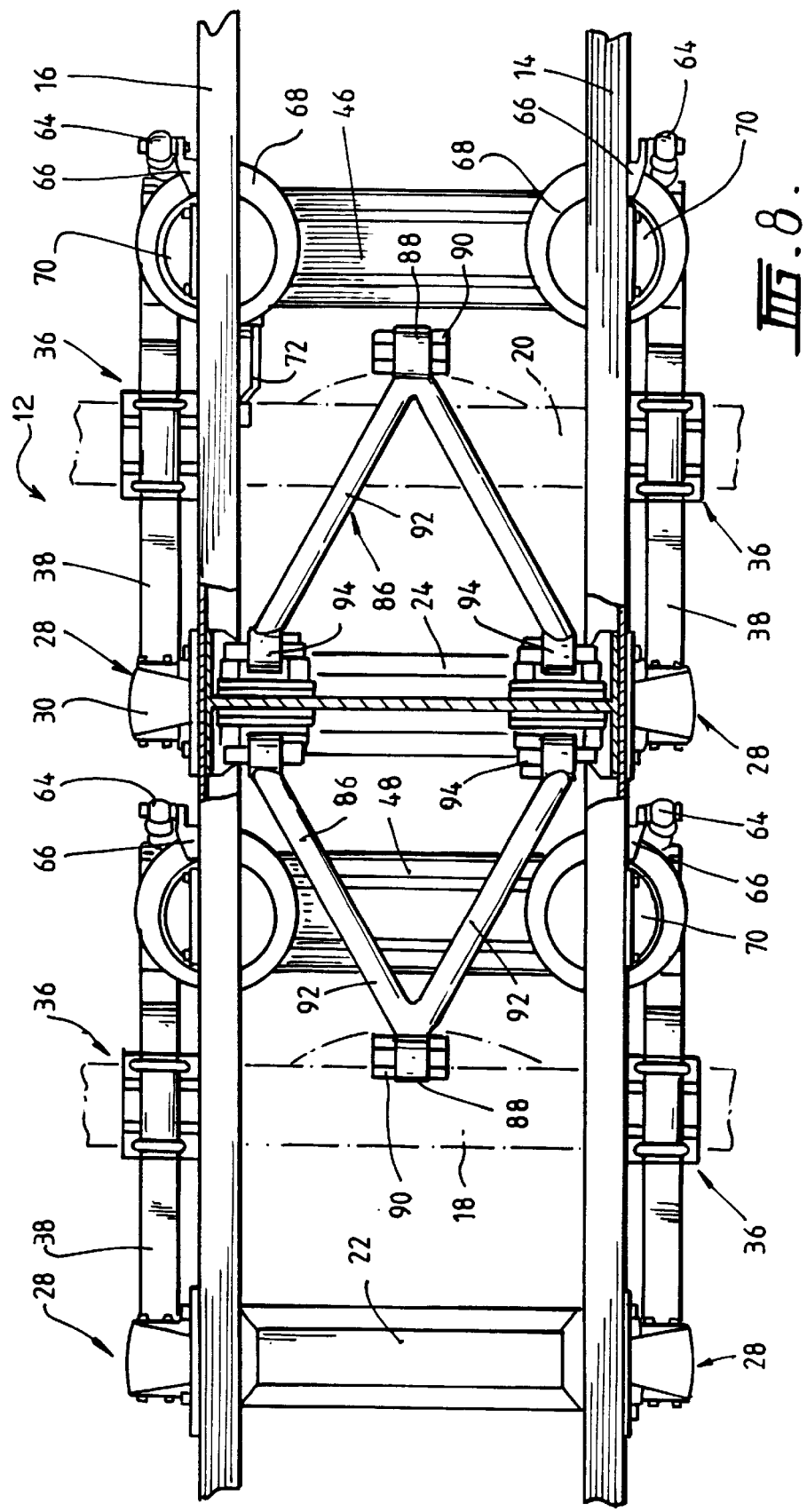

VEHICLE SUSPENSION

TECHNICAL FIELD

The present invention relates in general to trailing arm suspension systems and in particular to improvements in trailing arm air suspensions incorporating a spring steel Z-beam or step spring pivotally connected to a hanger.

PRIOR ART

Various suspension systems have been designed and developed incorporating an air spring. Some trailing arm air suspensions are provided with rigid axle attachment. The trailing arm rotates about a point or a zone near the front of the trailing arm. In some cases this point is a pivot bush contained in an eye formed at the front end of the trailing arm which allows rotation of a trailing arm but prevents vertical or horizontal movement. In other cases the pivot zone is at a slipper pad which prevents vertical movement of the trailing arm, combined with a link (torque rod or track rod) which prevents horizontal (push/pull) movement. Normal movement of this type of suspension therefore means that the main support member rotates about its forward end. Vertical movement at its rear end is controlled by the compressive forces of the air spring and the damping effects of shock absorbers. At some position in between the front and rear end of the trailing arm the truck drive axle is rigidly attached to the trailing arm. This is usually achieved by clamping through U bolts and positioning by a system of spring seats and axle caps which locate the axle at a particular angle at normal ride height of the suspension. Being located thus, the axle has vertical movement capability, relative to the truck chassis, controlled by the air spring and shock absorbers. Horizontal restraint, front to rear (push/pull loads) is provided via rigid attachment of the axle to the trailing arm and lateral restraint of the axles provided by a transverse torque rod arrangement which is located across the vehicle between the axle housing and the chassis. This transverse rod arrangement is sometimes known as a Panhard rod. These types of suspensions, whilst generally satisfactory, have a disadvantage in that, as well as the axle moving vertically, which is a suspension requirement, it also rotates together with the trailing arms. This axle rotation has two negative effects as follows: (1) the axle angle changes throughout the normal range of suspension movement and this is detrimental to the universal joints used to transmit driving torque to the angle; (2) the suspension is reactive to driving and braking torques which can lead to unwanted suspension movement, sometimes referred to as "wind-up", during application of normal drive line driving and braking torque. Attempts to fit an upper longitudinal torque rod to suspensions of the above type fail because, while the purpose of a longitudinal torque rod is to prevent axle rotation, in suspensions of this type the axle must rotate together with the trailing arm as it is rigidly attached to the trailing arm.

Attempts have been made to construct suspensions in which the axle pivots on the trailing arm. In one type of suspension the axle pivots on the trailing arm through a bush or bearing located below the axle. Suspensions of this type are shown in U.S. Pat. No 4,309,045 and they must have an upper torque rod linking a bracket on the top of the axle to the truck chassis. This gives a parallelogram linkage or a 4-bar chain type of mechanism. This means that the axle can move vertically without rotation and that the driving and braking torques have relatively little influence on the suspension movement. However, this design generally increases the mass of the suspension significantly and, because of the below axle connection to the trailing arm, vehicle ground clearance is reduced, which is a disadvantage in off-road applications.

SUMMARY AND OBJECTS OF THE INVENTION

The present invention aims to alleviate the above-mentioned problems.

According to one aspect of the present invention there is provided a suspension system for installation between a chassis having side rail members and cross frame members and an axle of a vehicle, said suspension system including a step spring having a forward generally horizontal section having a leading end, a rearward generally horizontal section having a trailing end, a generally vertical section between and contiguous with the forward and rearward sections and displacing the rearward section below the forward section, said leading end of said step spring being pivotally attached to said chassis, spring means extending between said chassis and said trailing end of said step spring and said axle being pivotally secured to a mounting means on said forward generally horizontal section, said pivot being above said axle.

Preferably said leading end is pivotally attached to a hanger on said chassis and a torque rod or other member links said chassis to said axle. In a preferred embodiment said spring means includes an air spring. Preferably said torque rod or other member is coupled to one of said side rail members. In a practical embodiment a further torque rod links said hanger to said axle.

BRIEF DESCRIPTION OF THE DRAWINGS

In order that the invention may be clearly understood and readily put into practical effect, preferred non-limitative embodiments of suspension systems will now be described with reference to the accompanying drawings in which:

FIG. 1 is a perspective view of a first embodiment of a suspension system made in accordance with the invention;

FIG. 2 is an enlarged view of part of the suspension system shown in FIG. 1;

FIG. 3 is a plan view of the suspension system shown in FIG. 1;

FIG. 4 is a side view of the suspension system shown in the direction of arrows 4—4 of in FIG. 3;

FIG. 5 is a cross-sectional view along and in the direction of arrows 5—5 of FIG. 3;

FIG. 6 is a cross-sectional view along and in the direction of arrows 6—6 of FIG. 3;

FIG. 7 is an exploded perspective view of the suspension shown in FIG. 1; and FIG. 8 is a plan view of a second embodiment of a suspension system made in accordance with the invention.

DETAILED DESCRIPTION OF THE DRAWINGS

For illustrative purposes, the suspension systems 10,12 in FIGS. 1 to 7 and FIG. 8 respectively are shown installed on a tandem axle vehicle. To avoid duplication of description identical reference numerals will be used for identical components in both embodiments. Since each suspension in the systems is identical to the other, only one need be described. Also, the suspension systems can be used equally effectively for a single axle or multiple axle vehicle. The vehicle is the kind having a left side rail frame member 14, a right side rail frame member 16, a forward axle 18 and a trailing axle 20. It will be understood that the suspensions illustrated for the left side of the vehicle is duplicated with the same kind of suspension on the right side of the vehicle. Because of the independence of the suspension systems, it can be used for a drive axle, a steering axle, or a tandem axle. Typically, the chassis also has cross frame members 22,24,26 extending from the left side frame member 14 to the right side frame member 16.

Each suspension incorporates a hanger assembly 28 which comprises a hanger bracket 30 fastened by bolts 32 to the side frame member 14. A rebound roller 34 is located inside hanger bracket 30 to support step spring 36. Step spring 36 has a forward generally horizontal section 38, a generally vertical section 40 and a rearward generally horizontal section 42. Horizontal section 42 slides into a shock absorber bracket 44 secured to a bolster beam 46. An upper spring seat 48 is clampingly secured to horizontal section 38 by U-bolts 50 engaging an upper pad 52. Spring seat 48 includes a pin guide 54 for receiving a hanger pin 56. An upper axle cap 58 is pivotally coupled to hanger pin 56. A lower axle cap 60 is bolted to upper axle cap 58 to captively retain axles 18,20 therebetween.

A longitudinal torque rod 62 is pivotally mounted to lower axle cap 60 and hanger bracket 30 to link axles 18, 20 to the frame members 14,16. A shock absorber 64 is pivotally attached at one end to shock absorber bracket 44 and at the other end to chassis shock absorber bracket 66 located on frame members 14,16. An air spring 68 is secured to frame members 14,16 by bracket 70 and to bolster beam 46. A levelling valve assembly 72 provides control for air springs 68.

An upper torque rod 74 is pivotally attached at one end to an axle bracket 76 and at the other end to transverse bracket 78 on cross frame member 24. A transverse torque rod 80 is pivotally connected at one end to a further axle bracket 82 and at the other end to a chassis bracket 84.

In the embodiment shown in FIG. 8 upper torque rods 74 and transverse torque rods 80 shown in FIGS. 1 to 7 are replaced by an A-frame member 86. Apex 88 of A-frame member 86 is pivotally attached. This arrangement will simplify the assembly of this embodiment as opposed to that of FIGS. 1 to 7.

The invention disclosed in the preferred embodiments provides a suspension which incorporates a pivot system (48,56,58) between axles (18,20) and the spring 36 with the pivot 56 located on top of axle (18,20). This arrangement allows upper torque rod 74 (FIGS. 1 to 7) or A-frame member 86 (FIG. 8) to link axles (18,20) to the frame member 14,16 to control driving and braking torque. The arrangement will also control the axle vertical movement. This provides a system in which the axles 18,20 can move vertically without rotation to provide relatively little influence on the suspension movement from driving and braking torque. The suspension will thus be non-reactive.

It is believed that the invention and many of its attendant advantages will be understood from the foregoing description and it will be apparent that various changes may be made in the form, construction and arrangement of the parts and that changes may be made in the form, construction and arrangement of the suspension system described without departing from the scope and spirit of the invention or sacrificing all of its material advantages, forms hereinbefore described being merely preferred embodiments hereof.

I claim:

1. A suspension system installed between a chassis having side rail members and cross frame members and an axle of a vehicle, said suspension system including a step spring having a forward generally horizontal section having a leading end, a rearward generally horizontal section having a trailing end, a generally vertical section between and contiguous with the forward and rearward sections and displacing the rearward section below the forward section, said leading end of said step spring being pivotally attached to said chassis, spring means extending between said chassis and said trailing end of said step spring and said axle being pivotally secured by print means to a mounting means on said forward generally horizontal section, said pivot means being above said axle.

2. The suspension system of claim 1, wherein said spring means includes an air spring.

3. The suspension system of claim 1, wherein said mounting means includes an upper spring seat secured to said horizontal section, said upper spring seat further includes a pin guide for receiving a hanger pin which provides said pivot, an upper axle cap pivotally located on said hanger pin and a lower axle cap secured to said upper axle cap to captively retain said axle therebetween.

4. The suspension system of claim 3, further including a torque rod linking said lower axle cap to a hanger on said chassis.

5. The suspension system of claim 1, further including a shock absorber pivotally attached at one end to said trailing end of said step spring and at the other end to said chassis.

6. The suspension system of claim 1, further including an upper torque rod linking said axle to one of said cross frame members.

7. The suspension system of claim 1, further including to a pair of divergent arms joined at an apex, said apex being pivotally attached to said axle and the distal ends of said divergent arms being pivotally coupled to one of said cross frame members.

8. The suspension system of claim 1, wherein a plurality of suspension systems are provided for a plurality of axles of said vehicle.

* * * * *